US005577110A

United States Patent [19]

Aquino

[11] Patent Number: 5,577,110
[45] Date of Patent: Nov. 19, 1996

[54] ACCESS TO CAPABILITIES OF OTHER TELEPHONE STATIONS

[75] Inventor: Marino K. Aquino, Aurora, Ill.

[73] Assignee: Lucent Technologies Inc., Murray Hill, N.J.

[21] Appl. No.: 420,613

[22] Filed: Apr. 10, 1995

Related U.S. Application Data

[63] Continuation of Ser. No. 53,031, Apr. 26, 1993, abandoned.

[51] Int. Cl.$^6$ ..................................................... H04M 3/42
[52] U.S. Cl. ........................ 379/201; 379/204; 379/207; 379/243
[58] Field of Search ............................... 379/91, 94, 111, 379/114, 115, 157, 201, 202, 204, 207, 243, 244, 245, 246

[56] References Cited

U.S. PATENT DOCUMENTS

| | | | |
|---|---|---|---|
| 3,867,582 | 2/1975 | Weed et al. | 379/198 |
| 4,049,915 | 9/1977 | Danner | 379/67 |
| 4,232,199 | 11/1980 | Boatwright et al. | 379/243 |
| 4,747,124 | 5/1988 | Ladd | 379/67 |
| 4,759,056 | 7/1988 | Akiyama | 379/216 |
| 4,783,796 | 11/1988 | Ladd | 379/67 |
| 4,899,373 | 2/1990 | Lee et al. | 379/207 |
| 4,930,152 | 5/1990 | Miller | 379/214 |
| 4,959,856 | 9/1990 | Bischoff et al. | 379/245 |
| 5,206,899 | 4/1993 | Gupta et al. | 379/120 |
| 5,247,571 | 9/1993 | Kay et al. | 379/207 |
| 5,278,897 | 1/1994 | Mowery et al. | 379/212 |
| 5,422,940 | 6/1995 | Endo et al. | 379/207 |
| 5,422,941 | 6/1995 | Hasenauer | 379/207 |
| 5,450,479 | 9/1995 | Alesio et al. | 379/144 |
| 5,452,347 | 9/1995 | Iglehart et al. | 379/199 |

FOREIGN PATENT DOCUMENTS 1245749  9/1989  Japan ..................................... 379/350

*Primary Examiner*—Krista M. Zele
*Assistant Examiner*—Scott L. Weaver
*Attorney, Agent, or Firm*—Dennis J. Williamson

[57] ABSTRACT

A method and apparatus for granting to a telephone customer the same features that he has at home when he is away from home. The customer, while being served from a remote switching system, is connected to the home switching system. After the customer is duly authorized, the block of data defining the features allocated to the customer is associated with the call control process for serving the customer from the remote switch. Advantageously, using such as arrangement, calls made by the customer from the remote switch may be billed to the account of the home customer and all features that are available to the home customer are made available for use by the customer when served by the remote switch.

2 Claims, 3 Drawing Sheets

ACCESS TO CAPABILITIES OF OTHER TELEPHONE STATIONS

This application is a continuation of U.S. application Ser. No. 08/053,031, filed on Apr. 26, 1993, now abandoned.

TECHNICAL FIELD

This invention relates to the provision of special features and capabilities to telecommunications customers.

PROBLEM

Special services such as custom features for individual telephone subscribers are becoming increasingly prevalent and increasingly important in the modern generation of program controlled switching systems. Such custom features include, but are not limited to, abbreviated dialing lists, allowance of access to a toll network, allowance of access to special private lines, special billing, allowance of access to services provided by intelligent peripherals, allowance of access to intelligent networks. Such services are tied to a particular telephone customer's terminal port on a switching system by means of a static data block of information provided for the customer served by that terminal port. A problem of the prior art is that the features which have been provided for a particular customer served by that terminal port are accessible to that customer only when he is using a telephone instrument connected to that terminal port and are not available to other customers unless these other customers have ordered similar features.

SOLUTION

The above problem is solved and an advance is made over the prior art in accordance with my invention wherein one telephone customer, hereinafter called the remote customer, is granted the features of the telephone terminal port, hereinafter called the home terminal port, associated with another customer, the home customer, by connecting the remote customer to a switch serving the home customer terminal port and providing the remote customer with a static data block of the home customer, required to access all features which are accessible to the home customer through dialing. Examples of such features are ability to make toll calls, conference call, call forwarding for incoming calls to the home terminal port, access to intelligent peripherals for, for example, voice dialing, abbreviated dialing (speed calling), special billing, and priority calling. A remote customer (caller) dials an access code and an identification of the home terminal port; in response a connection is set up between the remote customer and a shadow terminal port on the switch of the home terminal port, and the shadow terminal port is then associated with the static data block of the home terminal port. All permissions associated with that home terminal port, including permissions to alter specific portions of the home terminal port's static data block, are then also granted to the shadow terminal port. Advantageously, this arrangement permits a remote caller to receive all services granted through the static data block of the home terminal port and this is accomplished without major changes in the call control software of the switch serving the home terminal port. The call process environment for the home terminal port is effectively cloned for the shadow terminal port.

In accordance with one aspect of the invention, in order to prevent abuse of the feature, permission to use the static data block of the home terminal port is only granted if the remote customer dials an appropriate personal identification number or uses some other authentication procedure; this ensures that the remote customer is authorized to use the services granted by the home terminal port s static data block.

In accordance with another aspect of the invention, while the remote user is charged for the use of the telephone connection required to access the shadow terminal port, the home terminal port is charged for all services invoked in the name of the home terminal port including all connections set up from the shadow terminal port.

In accordance with another aspect of the invention, a first shadow terminal port may be used as a means of accessing a second shadow terminal port; this is useful if the access to the second shadow terminal port is denied to all except a limited group of users. In that case, once the caller has accessed the second shadow terminal port, the caller is provided with and billed for the services given to the second home terminal port and the first shadow terminal port is used only as an access mechanism.

In accordance with another aspect of the invention, a cellular caller can be granted all dialable features available to a land based caller by establishing a connection to a shadow terminal port on the same switch as the home terminal port. Once this connection has been established, the cellular caller has identical privileges to those granted a land based caller, since the cellular caller has adopted the static data block of the home terminal port.

In accordance with another aspect of the invention, several remote callers can be given the access to the privileges of the home terminal port simultaneously, i.e., can be associated with a common static data block.

In accordance with another aspect of the invention, the remote user has control of the shadow terminal port until the remote user explicitly releases the call connection (disconnects). While the call connection is up, unlimited calls can be made from the shadow terminal port.

Effectively, following the access to the shadow terminal port, the originator has essentially the same capabilities as he would have using a foreign exchange (FX) line. Advantageously, such an arrangement can be used for a wireless station to make many calls over the land based network with a single channel request.

DETAILED DESCRIPTION

Figure 1:
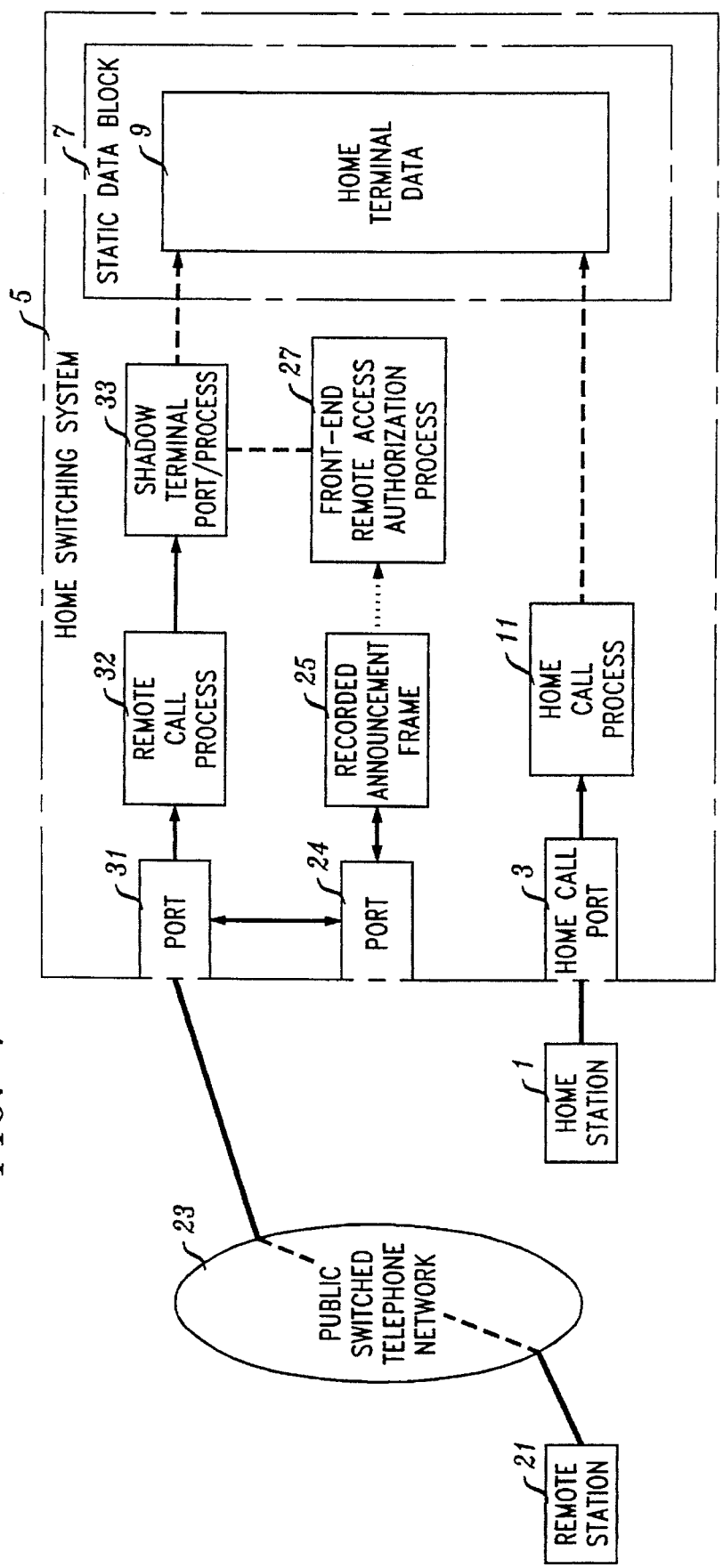
FIG. 1 is a block diagram illustrating the basic operation of applicant's invention.

FIG. 1 is a block diagram illustrating the basic operation of applicant's invention. Consider first the home station 1 which is simply one of many stations connected to home switching system 5. Home station is connected to home switching system 5 at home terminal port 3. Switching system 5 is controlled by one or more processors (not shown) each operating under the control of a stored program. If home station originates a call, then home station will be assigned a home call process, i.e., a block of memory for controlling the call. The home call process will have a pointer to home terminal port static data 9 in the static data block 7. The home terminal port static data describes all features which the home station is provided by the home switching system 5. Most of the data in the static data block is administered by an operating telephone company, but them are some dialable static data items such as a call forwarding number which are modified in response to information provided from the associated home terminal port. Remote station 21 is connected through public switched telephone network 23 to a terminal port 31, controlled by call process 32. Signals received over the connection to that terminal port, the connection being extendible to other terminal ports of the switch, are processed in the switch to determine authorization and to allow the remote station 21 to make requests for features assigned to the home station 1. Under the control of remote call process 32, the remote access request is recognized and the switch 5 connects port 31 to port 24 for accessing the remote announcement frame (RAF) 25. Port 24 is connected to RAF 25 and a control process, the front-end remote access authorization process (FRAP) 27 is assigned to control the RAF. After the caller's authorization has been verified under the control of FRAP, the remote caller on terminal port 31 is connected to a shadow terminal port and its process (shadow terminal port/process) 33. Shadow terminal port/process (STPP) 33 comprises a control process for communicating with remote call process 32 and the hardware for communicating with terminal port 31. STPP 33 obtains further dialed dual tone multifrequency (DTMF) digits from the remote station 21 through a connection to a digit receiver (not shown). STPP 33 has pointers to the translation data (block 9) of the home terminal port. The shadow process of STPP is identical to the home process 11 with a single exception that the pointers to the translation data are not the pointers that are tied to the physical home terminal port 3 but are pointers that have been derived and are at this point tied to STPP 33. Thereafter, the shadow call process handles all received dialable signals in the same way as the home call process: it can set up calls from the shadow port terminal continuously until the remote caller 21 disconnects and can modify any static data, such as a call forwarding number that can be modified by a home call process.

Figure 2:
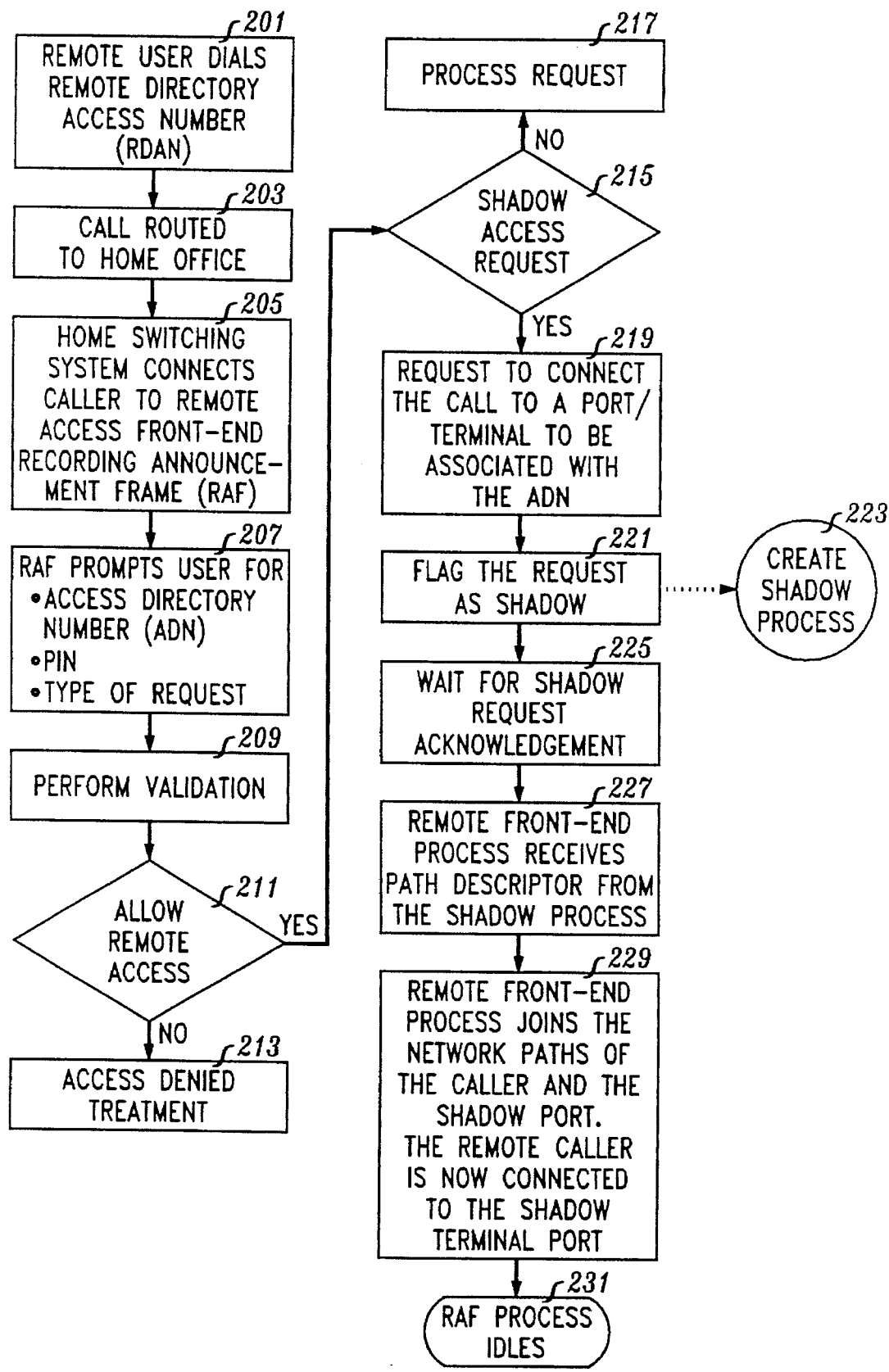
FIGS. 2 and 3 are flow diagrams illustrating a method for implementing applicant's invention.

FIG. 2 illustrates the process of giving the caller access to a shadow terminal port/process. The remote user dials a remote directory access number (RDAN) (action block 201). This remote directory access number is a number used for accessing the service of providing the caller the features of the home customer. The call is routed to the home switching system (action block 203) and the home switching system connects the caller to a remote access front-end recording announcement frame (RAF) (action block 205). The RAF prompts the user for the access directory number (i.e., the directory number of the customer whose features the remote user wishes to use), a personal identification number, and the type of request being made (action block 207). The type of request is required because the RAF is also used for providing a remote user with such existing features as remote call forwarding. The RAF performs a validation based on static data for the customer identified by the access directory number (action block 209). The authorization process 27 tests whether the validation is successful (test 211). If the caller is not allowed access to the services of the access directory number, then the caller receives some type of denied treatment, such as an announcement, from the switch (action block 213). If the caller is allowed access, a test is made whether the caller has made a shadow access request (action block 215). If so, then the remote user has made a shadow access request; the routing and terminal allocation process connects remote user on terminal port 31 to a terminal port/process 33, which can access the data of the access directory number (action block 219). The request is flagged as a shadow request (action block 221) and a shadow process is created in terminal port/process 33 (bubble 223). After waiting for acknowledgment of the shadow request (action block 225), the RAF process receives a path descriptor from the shadow process (action block 227). The RAF process then transfers the network path from the caller and to the shadow terminal port (action block 229) and the RAF process is idle (action block 231).

Figure 3:
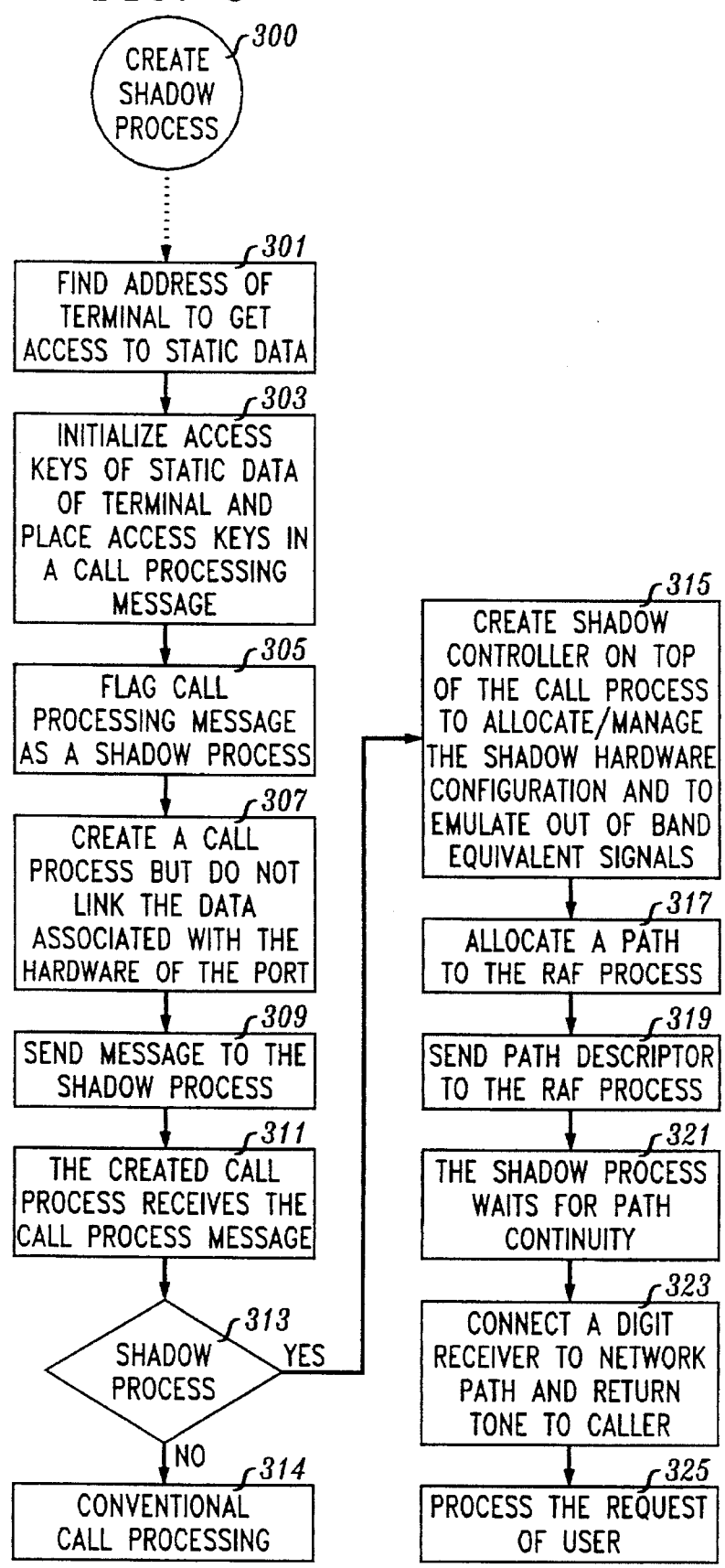

FIG. 3 illustrates the process of creating (301) the shadow process, and the operation of the shadow process. The static data for the home terminal port is found by the routing process (action block 301). The shadow process is initialized with the access keys of the static data of the home terminal port in the call processing message generated by the routing process (action block 303). The call processing message is flagged as a shadow process message (action block 305). The shadow call process is created but the hardware of incoming terminal port 31 is not linked to static data (action block 307). The call process message is sent to the newly created shadow terminal port/process (action block 309). The shadow process receives the call process message (action block 311). After processing the call process message, a test is made as to whether this is a shadow process (test 313). If not, normal call processing is performed (action block 314). If this is a shadow process, it is necessary to create a shadow controller on top of the call process (action block 315) in order to ensure that the special functions required within a shadow process are executed. Since call processing assumes that a process is controlling a terminal port or channel, it is necessary to override this assumption to access the required data for the shadow process. The shadow controller is also able to process the equivalents of out of band signals. For example, a remote caller dials, for example, #, as the equivalent of a "flash" signal since the flash signal is not transmitted over PSTN 23. A remote caller wishing to flash, for example, to establish a conference call, dials # as a flash/conference indicator and the shadow controller converts the # signal to the flash/conference indicator for further processing by the call processing program. A path is allocated between the caller's terminal port on the home switch and the shadow terminal port (action block 317). A path descriptor is sent to the RAF process (action block 319) which originally requested the creation of the shadow process and from which the shadow process must ask for control of the path to the remote station 21. The home switch waits until path continuity has been verified (action block 321) to be sure that the call is connected to the shadow port terminal and then connects a digit receiver to the terminal port on the home switch to which the caller is connected (action block 323). Thereafter, the request of the caller is processed using the static data of the access directory number (action block 325) in the same way as a local request from the home terminal port of the access directory number. Therefore, the remote caller 21 is provided with all originating services of the home port.

Several remote customers can be granted the services of the home port terminal customer simultaneously because separate shadow terminal port/processes can be created to handle these remote requests simultaneously. If one of the remote users has more than one call appearance, then each call appearance can be granted the services of the home port terminal or separate different home port terminals.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a telecommunications network having a first switching system in communication with a second switching system, a method for providing service features, comprising the steps of:

a) defining said features in a block of data and assigning said block of data to a customer at a first station served from a first terminal port on said first switching system;

b) using said features to process signals from said first station such that said features are available to process signals from the first station in accordance with said block of data;

c) connecting a first user at a second station being served on said second switching system to said first switching system via a second terminal port on said first switching system;

d) upon receipt of signals at said first switching system from said second station, allocating said block of data to said second terminal port such that said features are available to the first user to process signals from the second station;

e) using said features to process signals from said second station over the second port such that the same features available to the first station are available to the second station; and f) wherein said first user while being served by said second switching system has two call appearances on said second station and wherein granting said features to said first user comprises granting said features to one of said two call appearances.

2. In a telecommunications network having a first switching system in communication with a second switching system, a method of providing service features to customers, comprising the steps of:

a) defining features in a block of data and assigning said block of data to a customer at a first station served from a first terminal port on the first switching system such that said features are available to said customer at the first station to process signals from the first station;

b) connecting a second station being served on said second switching system to said first switching system via a second terminal port on said first switching system;

c) upon receipt of an authorized request from said second station, creating a shadow terminal port including a call process for said second terminal port and a controller to access said block of data and to process equivalents of out of band signals received from said second station;

d) allocating a path between said second terminal port and the shadow terminal port; and e) using said features to process the signals of the second station over the second terminal port such that the features process the signals of the second station in a manner identical to the manner in which signals are processed at the first station.

\* \* \* \* \*